United States Patent [19]

Fedrigo

[11] Patent Number: 4,743,058
[45] Date of Patent: May 10, 1988

[54] TAILGATE CONSTRUCTION

[76] Inventor: Joseph G. Fedrigo, P.O. Box 3105 Reposo Way, Belmont, Calif. 94002

[21] Appl. No.: 904,110

[22] Filed: Sep. 4, 1986

[51] Int. Cl.$^4$ .............................................. B62D 35/00
[52] U.S. Cl. .................................... 296/1 S; 296/57 R
[58] Field of Search ..................... 296/1 S, 50, 57 R

[56] References Cited

U.S. PATENT DOCUMENTS

| | | | |
|---|---|---|---|
| 4,063,772 | 12/1977 | Kincaid | 296/1 S |
| 4,136,905 | 1/1979 | Morgan | 296/50 |
| 4,165,118 | 8/1979 | Jensen | 296/50 |
| 4,201,411 | 5/1980 | Morgan | 296/50 |
| 4,353,589 | 10/1982 | Hartberg | 296/50 |
| 4,372,601 | 2/1983 | Smith | 296/50 |
| 4,475,759 | 10/1984 | Wine | 296/1 S |

Primary Examiner—Robert R. Song
Attorney, Agent, or Firm—Douglas A. Chaikin

[57] ABSTRACT

A vented tailgate construction for dumptrucks, pickup trucks and other vehicles which permits the free flow of air through the tailgate thereby decreasing air drag caused by the tailgate, increasing fuel efficiency, and increasing the field of rear vision for the vehicle operator. The tailgate construction discloses a shutter mechanism for preventing the loss of cargo when the vehicle's cargo compartment contains loose, fine, small and/or light particulate matter which might otherwise pass through the vented tailgate construction.

3 Claims, 2 Drawing Sheets

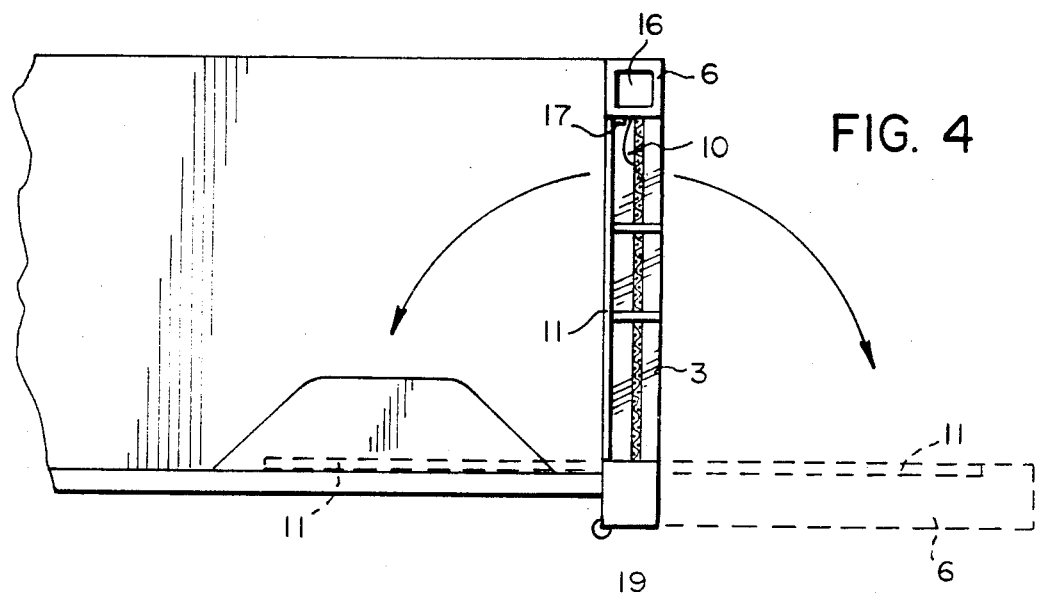

TAILGATE CONSTRUCTION

BACKGROUND OF THE INVENTION

Many vehicles have an open load-carrying compartment, hereinafter sometimes referred to as cargo compartment, composed generally of two sidewalls and front and rear walls or tailgates. Some obvious examples include pickup trucks and dump trucks. As the vehicle moves along the road, highway or track, wind resistance/air drag is encountered primarily on two surfaces, the front of the vehicle, which includes the front wall of the cargo compartment, and the rear wall or tailgate of the cargo compartment. This wind resistance/air drag must be met by increased fuel consumption in moving the vehicle or by reduction of wind resistance/air drag through aero dynamic design of the vehicle and the open load carrying compartment.

Several examples of prior art have attempted to deal with the problem of wind resistance/air drag and some of the prior art has attempted to meet the problem of cargo passing through the vented wall or tailgate. Prior art has attempted to achieve the same ends of reduced wind resistance/air drag and prevention of cargo loss through a variety of venting or shielding mechanisms. However, those mechanisms fail to achieve these ends in the following regards: They do not supply a complete seal and would lose cargo such as sand, hay, or other light or fine matter at the same time that they allow air to pass through the vented wall or tailgate of the load-carrying compartment (see U.S. Pat. No. 4,063,772, Dec., 1977, Kincaid); they have a cargo shield or baffle which provide an incomplete or nonlocking seal which would also allow fine and loose cargo to pass through the vents with wind pressure (see U.S. Pat. No. 4,165,118, Aug., 1979, Jenseon); or they provide complicated mechanisms with a series of latches, locks, hinges, and other moving parts which are time consuming to operate and susceptible of rapid wear and tear due to the great number of moving parts (see for example U.S. Pat. No. 4,136,905, Jan. 1979, Morgan and U.S. Pat. No. 4,201,411, May, 1980, Morgan). None of the prior art serves both ends with such ease and efficiency as this invention.

SUMMARY OF THE INVENTION

The present invention provides a simple, efficient aerodynamic design for reducing wind resistance/air drag on the front wall of vehicles without a cabin (e.g., railroad hopper car) and on the rear wall/tailgate of an open load-carrying compartment through the use of a vented wall or gate which vent may be readily closed through a hinged material shield or baffle when the cargo is of a fine or loose nature which might otherwise pass through the vented wall or tailgate.

The present invention has as its object the reduction of wind resistance/air drag on the front and rear walls of an open top load-carrying compartment on any vehicle. The front and rear walls are defined as the walls of the load carrying compartment which are arranged perpendicular to the direction of the vehicle's movement. For purposes of this application the rear wall would be that wall of the open load-carrying compartment analogous to the tailgate of a pickup truck and the front wall would be that wall of an open load-carrying compartment analogous to the compartment wall formed by the back of the pickup truck cabin.

The invention achieves reduced wind resistance/air drag and a corresponding increase in the fuel efficiency when the open load-carrying compartment is empty or the cargo consists of material too large to pass throught the vented walls or tailgate and the material shield or baffle is in the "open" position, adjacent to the cargo compartment floor bed. This invention achieves complete closure of the vented wall through the use of a hinged material shield or baffle and thereby prevents loss of cargo when the cargo consists of material small enough to pass through the vented walls or tailgate.

The material shield or baffle is hinged at the junction between the vented wall or tailgate and the floor or bed of the load carrying compartment. In the "open" position the material shield lies flat on the cargo compartment bed thus allowing air to pass freely through the vented wall or tailgate when the load carrying compartment is empty or has cargo too large to pass through the vents in the wall or tailgate. The material shield or baffle swings on its hinges into the "closed" position adjacent to the vented wall or tailgate and is held in place by one or more magnets or other latching mechanism which are built into the vented wall or tailgate of the load carrying compartment. Said magnets to be of a size and strength commensurate with the anticipated wind or air pressure encountered by the moving vehicle.

When the material shield or baffle is in the "open" position, i.e., adjacent to the cargo bed, the field of vision of the vehicle operator is also increased. This increased field of vision increases safe vehicle operation and can be very useful to the pickup truck or dump truck operator backing into work areas or attempting to hitch a trailer to the vehicle.

The vented wall or tailgate can be expressed in any number of embodiments, with the size and quantity of openings in the vent varying as required or dictated by the intended cargo. The vented wall or tailgate alone is not the subject of this patent application. Such vented walls or gates of open top load-carrying compartments on vehicles have been known and in use since time immemorial. Rather, it is the vented wall or tailgate in conjunction with the hinged material shield or baffle which is the subject of this patent application.

The features and advantages of the invention will be more completely understood upon consideration of the following specifications and accompanying drawings wherein like characters of reference designate corresponding parts throughout the several views of the invention.

For convenience and uniformity the invention is expressed in drawing form as a tailgate construction adaptable to a conventional pickup truck or other vehicle. However, these drawings are not intended to limit the patent claim to such trucks. Rather, the patent claims cover any and all open top load-carrying compartments on vehicles be they trucks, trailers, trains, automobile luggage racks, helicopter cargo bays, etc.

BRIEF DESCRIPTION OF THE DRAWINGS

FIG. 4 is a vertical cross-section view of the invention separated from the body of the truck.

These figures in the following detailed description disclose specific embodiments of the invention, however, it is to be understood that the inventive concept is not limited thereto. It may emodied in other forms.

DESCRIPTION OF THE PREFERRED EMBODIMENT

Figure 1:
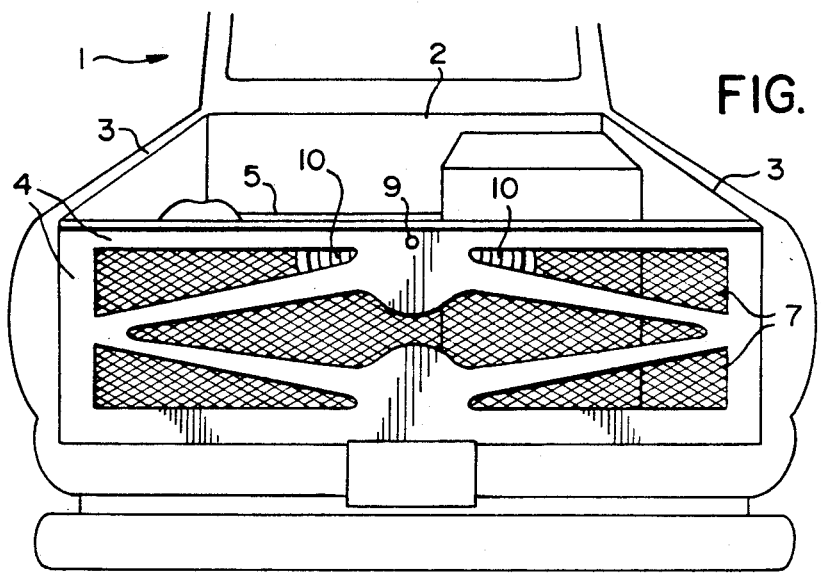
FIG. 1 is a perspective view illustrating the invention installed on a pickup truck.

Shown in FIG. 1 is a cargo carrying vehicle 1, specifically depicted in FIG. 1 as a pickup truck, with an open-top cargo carrying compartment formed by the back of the vehicle cabin 2, two sidewalls 3, a tailgate 4, and a truckbed 5. Normally such a pickup truck or cargo carrying vehicle 1 closes the rear wall of the cargo carrying compartment with a tailgate 4. Generally the tailgate 4 is a solid structure through which no air can flow. Rather, as the vehicle moves forward air presses against the inside or truckbed side of the tailgate 4, causing air drag and unnecessary fuel consumption.

Figure 2:
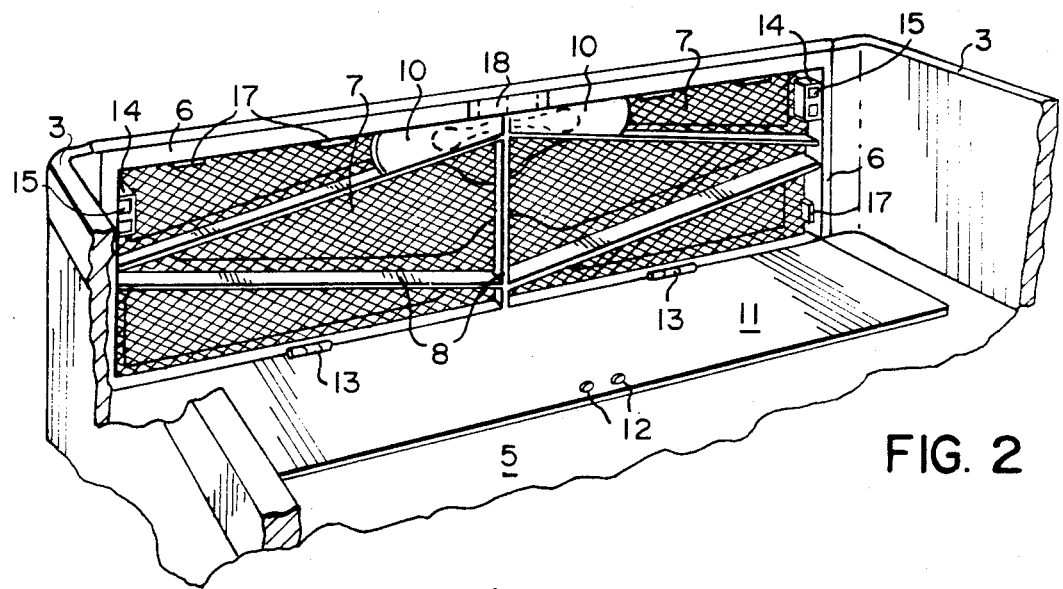
FIG. 2 is an enlarged perspective view with the material shield or baffle in the "open" position.

FIG. 2 shows the improvement which is my invention which is an air-permeable wall or tailgate assembly which reduces air drag and fuel consumption. My invention works as an improvement over prior art by allowing air to flow through the wall or tailgate through an air permeable screen 7 when the material shield 11 is in the "open" position, namely, adjacent to and lying flat on the truckbed 5. The same tailgate assembly can then be used to transport light or fine cargo (e.g. sand or straw) without loss of cargo through the air permeable screen 7 by "closing" the material shield 11. The material shield 11 is "closed" by lifting the material shield 7 by grasping it through the grip holes 12 and rotating the material shield upward on its hinges 13 into position adjacent to the tailgate frame 6. The material shield 11 is then held in place by the magnets 15 or other locking mechanism. In this embodiment the magnets 15 in turn are held by magnet housing 14 which is welded to the tailgate frame 6.

When the material shield 11 is in the "closed" position, whether the tailgate 4 be open for loading cargo into the cargo carrying compartment or upright and locked to the sidewalls 3 by the tailgate locking bolts 16 for travel, it is held in place by the magnets 15 or other locking mechanism and supported by the magnet housing 14, the perimeter support plates 17, and the support ribs 8. The magnet housing 14, the perimeter support plates 17, and the support ribs are all recessed inside the tailgate frame 6 a distance equal to the thickness of the material shield 11 so that when the material shield 11 is in the "closed" position, namely, upright and adjacent to the tailgate frame 6, the side of the material shield 11 facing the vehicle cabin 2 or cargo compartment is flush with the side of the tailgate frame 6 facing the vehicle cabin 2. Thus the interior surface of the tailgate assembly 4 as a whole forms a flat smooth surface.

FIG. 2 depicts the tailgate assembly which is my invention as composed of a tailgate frame 6 of rectangular steel tubing containing a tailgate locking mechanism 9 inside the top length of the tailgate frame tubing. Future improvements in materials may entirely eliminate the need for a frame and may change the entire system of locking the tailgate in place, supporting and holding the material shield. The locking mechanism 9 is simply the same mechanism found in all other pickup truck tailgates 4 with the exception that this invention employs a key and tumbler lock. The tumbler lock is accessible, for repair or replacement, through the removable plate 18. The tailgate locking mechanism 9 holds the tailgate 4 in the upright, closed position with simple tailgate locking bolts 16 which match the boltholes in the truckbed sidewalls 3. The support ribs 8, perimeter support plates 17, and the magnet housings 14 (with magnets 15 in place) are then welded, cast, or molded in place within the tailgate frame 6. For as long as a frame and support ribs and plates are still necessry due to material strength the air permeable screen 7 is then welded, cast, or molded to the side of the tailgate frame 6 and support ribs 8 facing out or away from the vehicle cab. The extra brakelights 10, if desired, may be placed in a secure position between the tailgate frame 6 and the support ribs 8 with the wiring running inside the tailgate frame tubing or underneath the tubing to a switch attached to the sidewalls 3. Finally, the hinges 13 which connect the material shield 11 and the tailgate frame 6 are welded to the material shield 11 and the tailgate frame 6 and the whole assembly is placed on hinges 19 compatible with the particular vehicle for which intended and installed on the cargo carrying vehicle 1.

FIG. 4 shows a side view of the tailgate assembly 4 and suggests the four potential positions of my invention: (1) the tailgate 4 is upright and locked to the sidewalls 3 with the material shield 11 in the "open" position adjacent to the truckbed 5; (2) the tailgate 4 is upright and locked to the sidewalls 3 with the materials shield 11 in the "closed" position adjacent to the tailgate frame 6; (3) the tailgate 4 is open for cargo loading and the material shield 11 is in the "open" position adjacent to the truckbed 5; and (4) the tailgate 4 is open for cargo loading and the material shield 11 is in the "closed" position adjacent to the tailgate frame 6.

When the tailgate 4 is open for cargo loading and the material shield 11 is in the "closed" position the magnet housing 14, the support ribs 8, and the perimeter support plates 17 will support and prevent the straining and warping of the material shield 11 during the time that loads are placed on the material shield 11.

Figure 3:
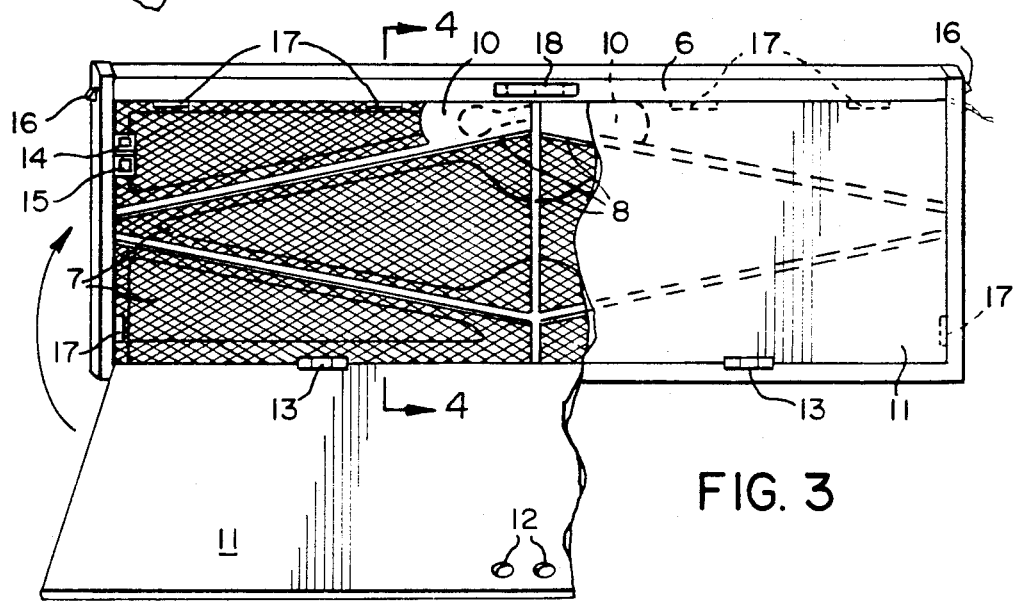
FIG. 3 is a vertical cross-section view similar to FIG. 2 with the material shield or baffle in "open" position, i.e., adjacent to the cargo compartment bed on the left side and in the "closed" position, i.e., adjacent to the tailgate frame on the right side.

The placement of the support ribs 8 and the perimeter support plates may be varied from the design embodied in FIG. 2 and FIG. 3. Any alteration of this design must, however, provide effective support to the material shield 11 and take into consideration the placement of the magnet housing or other locking mechanism and the extra brakelights 10.

The materials used in the prototype model of this invention were primarily steel, but this invention is not limited to steel components. The tailgate frame tubing 6 will generally be composed of steel or some metal alloy of similar strength. Plastic may eventually replace the metal alloys.

The material shield 11 must also be composed of a heavy-stress bearing material such as steel, other metal alloys, or plastic. In any case, if magnets are used to hold the material shield in the "closed" position, then the material shield must have sufficient iron content in the corners of the material shield 11 such that the magnets 15 will hold the material shield 15 in the "closed" position.

The particular embodiment of the air permeable screen depicted in FIG. 2 and FIG. 3 shows one made of punched sheetmetal. My invention is not limited, however, to the use of such mesh screen material or punched sheetmetal. Rather, my invention embodies any and all screens or grills which allow air to freely flow through when the vehicle is in motion: Even simple horizontal or vertical bars affixxed to the tailgate frame 6.

What is claimed as invention is:

1. A low maintenance, vented tailgate construction as a means of reduction of air drag on vehicles with open top cargo carrying compartments, comprising:
   (a) a frame of appropriate size and shape to form the periphery of a wall of the cargo carrying compartment of the cargo carrying vehicle;
   (b) attachment means for fixing the frame to the cargo carrying vehicle;
   (c) an air-permeable screen of appropriate size and shape to fit within the frame so as to form, in conjunction with the frame, an air permeable wall of the cargo carrying compartment;
   (d) the air-permeable screen being joined to the interior periphery of the frame so as to be permanently attached to the frame;
   (e) a material shield or baffle of appropriate size and shape to fit snugly within the interior perimeter of the frame so as to be able to prevent the loss, in transit, of cargo of such small size as to be capable of passing through the holes in the air-permeable screen;
   (f) at least one hinge joining the material shield to one side of the frame so as to enable the material shield to be rotated into a position adjacent to and within the perimeter of the frame in order to prevent cargo loss and to enable rotation of the material shield into a position adjacent to a second wall of the cargo carrying compartment of the cargo carrying vehicle;
   (g) latching mechanisms for holding the material shield in position adjacent to and within the perimeter of the frame; and
   (h) support ribs joined to the interior periphery of the frame, recessed from the suface of the frame which faces the cargo carrying compartment approximately the thickness of the material shield as a means of supporting the material shield when the tailgate construction is opened for loading cargo into or out of the vehicle.

2. The tailgate construction of claim 1 wherein support plates are joined to the interior periphery of the frame, recessed from the surface of said frame which faces the cargo carrying compartment approximately the thickness of the material shield so as to provide a means of supporting the periphery of said material shield when the tailgate construction is opened for loading cargo into or out of the vehicle.

3. The tailgate construction of claim 2 wherein a grip or handle is joined to or molded as a part of the material shield, generally near the edge of said material shield which is furthest from the hinged edge of said material shield, so as to allow easy grasping of said material shield in order to rotate it from one position to the other.

* * * * *